C. UEBELMESSER.
FRAMING DEVICE.
APPLICATION FILED MAR. 11, 1915.

1,291,275.

Patented Jan. 14, 1919.
2 SHEETS—SHEET 1.

WITNESSES:

INVENTOR
Charles Uebelmesser
BY

ATTORNEY

C. UEBELMESSER.
FRAMING DEVICE.
APPLICATION FILED MAR. 11, 1915.
1,291,275.
Patented Jan. 14, 1919.
2 SHEETS—SHEET 2.
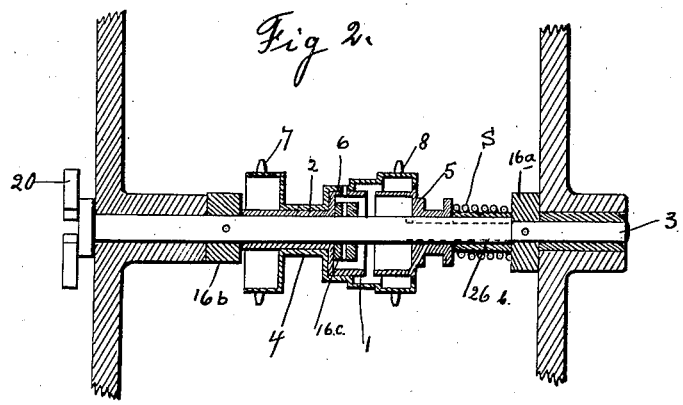
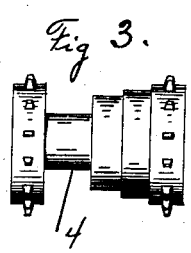
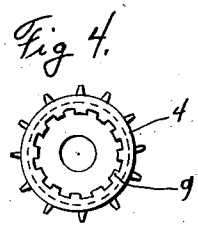
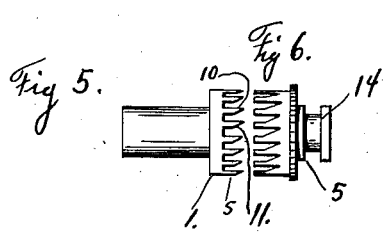
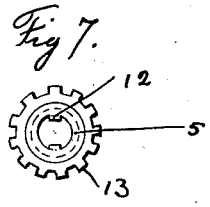
WITNESSES:
INVENTOR
Charles Uebelmesser
BY
ATTORNEY

UNITED STATES PATENT OFFICE.

CHARLES UEBELMESSER, OF NEW YORK, N. Y., ASSIGNOR TO CRU PATENTS CORPORATION, A CORPORATION OF NEW YORK.

FRAMING DEVICE.

1,291,275.      Specification of Letters Patent.      Patented Jan. 14, 1919.

Application filed March 11, 1915. Serial No. 13,816.

*To all whom it may concern:*

Be it known that I, CHARLES UEBELMESSER, a subject of the Emperor of Germany, residing at New York city, in the county and State of New York, have invented certain new and useful Improvements in Framing Devices, of which the following is a clear, full, and exact description.

The object of this invention is to provide means for changing the register of a moving picture film with the projecting aperture of the projecting machine during its operation, or otherwise, but preferably while the film is being fed through the machine by the operator, and a still further object is to place the control of such change of register closely adjacent to the operator's hand, which is rotating the crank, so that the register may be changed by him while he is grasping the handle.

In carrying out my invention, a suitable changeable clutch operating on the escapement wheel is secured between the intermittent feed sprocket and the intermittent motion shaft, and suitable mechanism connected thereto is led down to the operator's handle, so that by pressing the same the change of register may be readily effected.

In carrying out my invention, the intermittent motion shaft carries free to turn thereon the feed sprocket provided with a clutch member, and also provided with an engaging tooth member, so that immediately upon the release of the actuating device controlled by the operator the slidable clutch will come into engagement with the tooth member and the feed sprocket be only momentarily disengaged by the shaft. Upon a throwing of the clutch back into clutch position, the gear teeth are so formed with certain slanted angular members thereon, that as soon as the sliding clutch has released from the tooth member, the clutch will slide into place, one tooth in advance of the position it occupied before, in a manner analogous to a watch escapement. In this manner it will be seen that upon throwing the clutch out of and then into position a relative change will be effected rotarily of the feed sprocket upon the shaft by the distance of one tooth, and by making sufficient teeth upon the clutch a fine adjustment can readily be secured. It is of no importance what mechanism supplies the intermittent motion to the shaft 3. It is generally accomplished in this art by a Geneva stop wheel, and its associated mechanism. I have therefore only shown the Geneva wheel and its connections diagramatically in the drawings, the intermittent shaft and its clutch mechanisms being shown in detail.

The scope of my invention will be pointed out in the claims.

In the accompanying drawings,

Fig. 2 is a central horizontal section through the center of the intermittent shaft.

Fig. 3 is a side elevation of my improved sprocket reel.

Fig. 4 is an end view of the same.

Figs. 5 and 6 are respectively side elevations of the two escapement clutch members.

Fig. 7 is an end view of Fig. 6.

Figure 1:
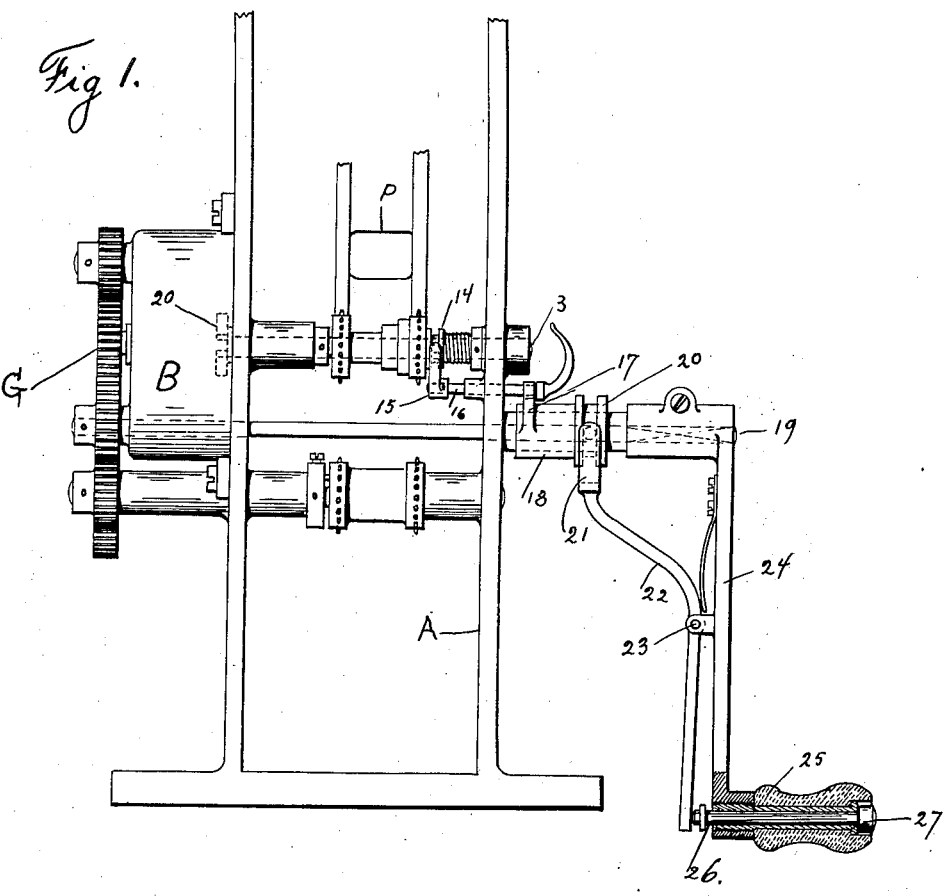
Figure 1 is a side elevation of sufficient of a projecting machine to illustrate my invention.

As shown in the drawings, A is the frame in which is mounted the usual continuously rotating film take-up sprocket geared by suitable gearing G to the mechanism within the box B, which operates the Geneva stop wheel 20. On the shaft of the Geneva stop wheel are three collars $16^a$, $16^b$ and $16^c$ pinned to the shaft. The collar $16^c$ holds the clutch member 1 from sliding longitudinally upon the shaft, and such clutch member is provided with a sleeve 2 freely turning on the shaft. On the sleeve 2 the intermittent feed sprocket 4 is mounted and pinned at 6 to the clutch member 1. The feed sprocket carries recesses in each end, and is provided with the usual sprocket teeth 7 and 8.

As shown in Fig. 4, the feed sprocket 4 has a series of square recesses and teeth 9 formed in a flange turned in from the rim of the feed sprocket. The clutch member 1 is formed with teeth of the escapement type formed with one straight side 10 terminating in a point, and a slanting opposite side 11. The movable clutch member 5 slides in grooves upon the shaft 3, which grooves are engaged by lugs 12, extending into the bore of the clutch member 5. The movable clutch member 5 is formed with square projecting teeth 13 to engage the recesses 9 of the feed sprocket 4, and with teeth adapted to engage the spaces between the teeth of the clutch member 1. A clutch collar 14 on the sliding clutch member may be moved to the right in Fig. 2 to the extent shown in that drawing only being prevented from further movement by the sleeve 26ᵇ around which sleeve is a spring S, which normally tends to hold the clutch teeth in engagement. A yoke 15 engages the collar 14, and is slidable with a rod 16 in suitable bearings in the frame A by means of a lug 17 on a sleeve 18, which is free to rotate on the crank shaft 19, and which sleeve is provided with a collar 20 engaged by a yoke 21 on the end of the lever 22, pivoted at 23, to the crank arm 24. A crank handle 25 is provided, having a projecting rod 26, and a button 27, at the end, which, upon being depressed into the position shown in Fig. 1, will hold the clutch members out of engagement, but when released will permit the reëngagement of the clutch members. P is the picture aperture with which the film must be brought into register.

In operation, if the horizontal top and bottom lines of the picture are not in register with the aperture P, the operator presses the button 27, throws the clutch teeth out of engagement with one another, but just as the sliding teeth leave the non-sliding teeth the projections 13 on the sliding clutch member engage the apertures 9 of the sprocket. Upon releasing the button 27, while still rotating the handle, the sliding clutch member will return. The projections of the clutch member, due to their pointed or escapement shape, will cause the projections of the sliding part to slide down the angle on the non-sliding tooth, and advance the reel one tooth with relation to the intermittent shaft, thus correcting by the distance of one tooth the framing of the aperture.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. In a motion picture apparatus the combination with a film feed sprocket, a shaft therefore, means for rotating said shaft and means coöperating with said shaft-rotating means for engaging and disengaging said film feed sprocket with said shaft.

2. In a motion picture apparatus the combination with a shaft, a film feed sprocket mounted on said shaft, a handle for rotating said shaft, and means coöperating with said handle for disengaging said sprocket with said shaft during the rotation of said shaft.

3. The combination with a continuously rotating shaft and intermittently rotating shaft, a handle for continuously rotating said first mentioned shaft, a film feed sprocket carried by said intermittently rotating shaft, and means controlled at said handle for disengaging said film sprocket from said intermittently rotating shaft.

4. The combination with a shaft, means for continuously rotating said shaft, a second shaft, and means operated by the rotation of said first shaft for intermittently rotating said second shaft, a film feed sprocket mounted on said intermittently rotated shaft, and means associated with said shaft-rotating means for disengaging said film feed sprocket from said intermittently rotated shaft.

5. The combination with a shaft, means for continuously rotating said shaft, a second shaft, and means operated by the rotation of said first shaft for intermittently rotating said second shaft, a film feed sprocket mounted on said intermittently rotated shaft, a clutch interposed between said film feed sprocket and said intermittently rotated shaft and means controlled during the rotation of said continuously rotated shaft and associated with said rotating means for operating said clutch.

6. The combination with a film feed sprocket, a shaft therefor, means for rotating said shaft, said film feed sprocket being mounted loosely on said shaft, said shaft and said film feed sprocket each having secured thereto, a ratchet wheel arranged to coöperate with each other to positively rotate said feed sprocket upon the rotation of said shaft, a second shaft geared with said first mentioned shaft; connections between said shafts, for intermittently rotating said first mentioned shaft upon the continual rotation of said second shaft, means for continually rotating said second shaft and connections between said means and said feed sprocket for controlling said ratchet wheels to disengage the same from each other.

7. In a motion picture machine, a film feed sprocket for advancing the film, a shaft therefor, means for intermittently operating said shaft, said film feed sprocket being loosely mounted on said shaft, and having a clutch member, a second clutch member fixed to said shaft and adapted to engage said first clutch member, a lever for controlling one of said clutch members to alter the position of the feed sprocket relative to the shaft, a predetermined amount substantially, as described.

Signed at New York city, New York, March, one thousand nine hundred and fifteen.

CHARLES UEBELMESSER.

Witnesses:
R. L. WINDHOLZ,
FRED F. WEISS.